United States Patent [19]

Oestreich

[11] Patent Number: 4,673,247
[45] Date of Patent: Jun. 16, 1987

[54] OPTICAL CABLE FOR OVERHEAD HIGH-TENSION LINES

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 719,529

[22] Filed: Apr. 3, 1985

[30] Foreign Application Priority Data

Jun. 29, 1984 [DE] Fed. Rep. of Germany ....... 3424047
Feb. 6, 1985 [DE] Fed. Rep. of Germany ....... 3504041

[51] Int. Cl.$^4$ .......................... G02B 6/44; H01B 11/22
[52] U.S. Cl. .................................. 350/96.23; 174/70 R
[58] Field of Search ..................... 350/96.23; 174/70 R

[56] References Cited

U.S. PATENT DOCUMENTS

| 4,342,500 | 8/1982 | Oestreich et al. | ................ 350/96.23 |
| 4,575,184 | 3/1986 | Ueno et al. | ........................ 350/96.23 |

FOREIGN PATENT DOCUMENTS

| 53-06048 | 1/1978 | Japan | ................. 350/96.23 |
| 54-24647 | 2/1979 | Japan | ................. 350/96.23 |
| 58-162911 | 9/1983 | Japan | ................. 350/96.23 |

Primary Examiner—John Lee
Attorney, Agent, or Firm—Hill, Van Santen, Steadman & Simpson

[57] ABSTRACT

An outlet cladding of an optical aerial cable for overhead high-tension lines is formed of a material that is self-quenching and resistant to partial discharge and tracking current. An additive of metal hydroxide is provided in the outer cladding for this purpose.

14 Claims, 3 Drawing Figures

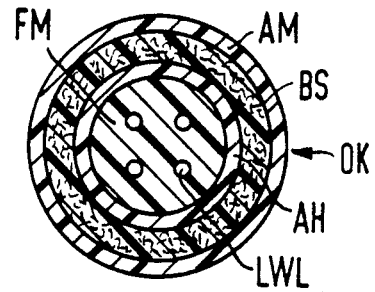
FIG 1
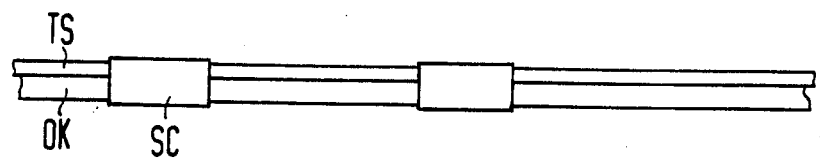
FIG 2
FIG 3
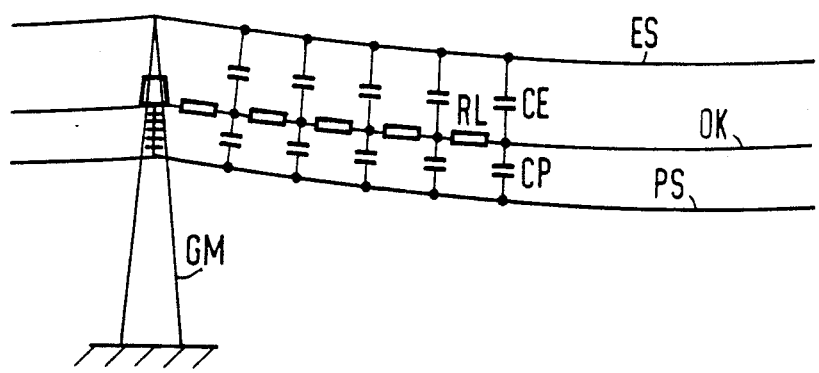

OPTICAL CABLE FOR OVERHEAD HIGH-TENSION LINES

BACKGROUND OF THE INVENTION

The invention relates to an optical aerial cable for overhead high-tension lines comprising an outer cladding formed of plastic.

When an optical aerial cable is not clipped to a guide wire of an overhead high-tension line (voltage potential $U \geq 30$ kV), but is suspended by itself as a self-supporting aerial cable, corona and tracking current stresses can occur, particularly given stronger aerial fields due to the capacitive coupling of the soiled and moistened cable surface to neighboring phase wires.

SUMMARY OF THE INVENTION

An object of the present invention is to fashion a cladding for an optical aerial cable such that its tracking current behavior is adequate and such that it does not melt or evaporate. It should also be guaranteed that the cladding material is economical in price. In accordance with the invention, this is achieved given an optical aerial cable of the type described above wherein a self-quenching, self-protecting material resistant to partial discharge and tracking current is employed as the material for the outer cladding. In this fashion, discharge events as well as tracking currents do not lead to any undesired vitiation of the aerial cable.

In a particularly preferable embodiment of the invention, a residue of the outer cladding remaining when heated or burned is highly insulating and creep resistant.

The cladding material employed in accordance with the invention also contains a non-carbonizing plastic and can preferably be rendered resistant since a high proportion of a metal hydroxide which emits water at higher temperatures is added to it. This has a cooling and therefore quenching effect on the glow discharge, creep discharge, or arc discharge without having the combination produce conductive residues. It has turned out that these properties are applicable not only to ignition due to a high-power arc but, above all else, are also applicable to the glow and creep discharges. The surface of a plastic which insulates per se is destroyed by the high or greatly locally limited temperature of the discharge path which acts in a (very low-current) discharge channel. The water vapor which is immediately released also has a quenching and cooling effect. The metal oxide skeleton which remains is fully insulating and protects the plastic surface against further erosion. Since the plastic is directly protected under the exposed aluminum oxide, the creep discharge is arrested. Comparable properties are otherwise exhibited only by (expensive) fluor-polymer cladding materials which, however, release HF (hydrofluoric acid) and the reaction products thereof when they are burned. In the invention, the unburned or partially burned plastics matrix does not form any conductive residues or bridges. The cable thus remains non-conductive.

The tracking current behavior of the cable of the invention is far better than that of normal polyethylene copolymer claddings. The local heating on which tracking current damage is based is alleviated in the cladding material of the invention by the emission of water vapor. Melting and evaporation phenomena (for example, given arc heating) can hardly be documented since, after the surface has been attacked, a protective mineral surface ($Al_2O_3$) immediately arises from the metal hydroxide, for example the aluminum hydroxide $Al(OH)_3$. This results since an optimally high constituent of 30 to 60 weight percent, and preferably around 50 weight percent, metal hydroxide is contained in the cladding mixture. A PE-EVA copolymer is advantageously employed as the base material. The incorporation of the metal hydroxide, however, can also occur without EVA by means of cross-linking of the base plastic. Other suitable base plastics are ERP and EPDM.

Homopolar or weakly polar compounds are preferably employed as the plastics constituent for the cladding structure.

BRIEF DESCRIPTION OF THE DRAWINGS

FIG. 1 is a cross-section through the structure of an optical aerial cable for overhead high-tension lines according to the invention;

FIG. 2 illustrates the layout of an overhead high-tension line with an optical aerial cable; and FIG. 3 shows relationships between lines given a tracking current load.

DESCRIPTION OF THE PREFERRED EMBODIMENTS

In FIG. 1, the optical aerial cable is referenced OK. Its outside cladding AM is formed of a plastic material containing a metal hydroxide, particularly aluminum hydroxide. The proportion of the metal hydroxide is selected between 30 and 60 weight percent, and preferably around 50 weight percent (20–30 volume percent).

Such a cladding material is creep resistant, so that no destruction can occur given low-current surface discharge. The tracking current behavior is far better than, for example, standard polyethylene jackets. The resistance to radial partial discharges (corona) is also far better than given otherwise standard materials.

The structure of the cable core can occur in traditional known prior art fashion, whereby the present embodiment shows a filled cable wherein a filler compound FM is employed as the core filling. There are no electrically conductive parts in the cable OK (i.e. a fully dielectric format has been selected). The individual light waveguides LWL are integrated in the inside of a supporting sheath AH which is formed of plastic and on which a tensile covering BS is applied, all as is known in the prior art. The optical cable OK shown in FIG. 2 can be (non-conductively) clipped to an insulating carrier cable TS (clips SC—see FIG. 2). When a self-supporting optical cable is employed, fastening to a cross-piece of a tower respectively suffices. The cable format is correspondingly modified and a carrier cable is provided in the cable itself, this carrier cable being capable of assuming the mechanical load.

The illustrative embodiment of FIG. 3 shows a high-tension line wherein the optical cable OK is independently laid (i.e. outside of the phase wire and of the guard wire) and is held at the cross-piece of a lattice tower GM. The guard wire is referenced ES and the phase wire is referenced PS. Since the optical cable OK is composed of insulating material, the cladding surface in the equivalent circuit diagram can be simulated by a succession of series resistances RL. Shunting capacitances lie between the optical cable OK and the guard wire ES, these being referenced CE, whereas the shunting capacitances between the optical cable OK and the phase wire PS are referenced CP. The corona and tracking current load deriving given such an arrangement can lead to a local decomposition of the cladding and to erosion which is alleviated by emission of water vapor. A melting and evaporation can hardly be documented since, after the surface has been attacked, a protective mineral surface arises, this stemmming from the use of aluminum hydroxide in the cladding material.

The composition for the outer cladding AM of the optical cable OK can advantageously comprise the following values:

55 Wt.% Aluminum hydroxide
38 Wt.% PE/EVA copolymer
4 Wt.% Ethylene/propylene rubber
0.3 Wt.% Stabilizer
0.5 Wt.% Lubricant
1.5 Wt.% Coloring pigments
0.7 Wt.% Hydrosilicon In the above composition, it is also possible to replace the aluminum hydroxide with zinc hydroxide or magnesium hydroxide. The use of aluminum hydroxide, however, is preferred.

The metal hydroxide is incorporated in a PE/EVA copolymer as a base material. Specifically, the metal hydroxide may be incorporated in EPR or EPDM as a base material.

As the previously mentioned stabilizer there can be used a phenolic antioxidant like Irganox 1010 (Tradename of Ciba Geigy, Basel, Switzerland). For the lubricant PE-wax can be used.

The cable outer cladding can be manufactured by mixing all components (except silan) together in an internal mixer (kneader). After adding silan, another internal mixing process is performed. The product thus produced is provided into a granulating machine. The granules delivered to this machine are fed to an extruder which produces the cladding or sheath AM.

Although various minor changes and modifications might be proposed by those skilled in the art, it will be understood that I wish to include within the claims of the patent warranted hereon all such changes and modifications as reasonably come within my contribution to the art.

I claim as my invention:

1. An optical, aerial, overhead high-tension line cable system, comprising:
   a conductive high tension power line;
   a non-conductive optical cable having no electrically conductive parts and running alongside of and spaced from the power line; and
   said optical cable having
      at least one light waveguide,
      an outer cladding surrounding the light waveguide,
      means between the light waveguide and outer cladding for support and positioning of the light waveguide within the outer cladding,
      said outer cladding comprising a plastic, self-quenching, self-protecting material means for providing resistance to partial discharge and tracking current and which remains relatively highly insulating and creep resistant when heated, burned, or affected by electrical influences resulting from the high tension on the power line, and
      said outer cladding including a metal hydroxide between 30 and 60 weight percent.

2. An optical aerial cable system according to claim 1 wherein a residue of the outer cladding which remains when heated, burned, or subjected to the electrical influences is highly insulating and creep resistant.

3. An optical aerial cable system according to claim 1 wherein the outer cladding contains about 50 weight percent metal hydroxide.

4. An optical aerial cable system according to claim 1 wherein a plastics material of the outer cladding comprises a homopolar compound.

5. An optical aerial cable system according to claim 1 wherein a plastics material of the outer cladding comprises a weakly polar compound.

6. An optical aerial cable system according to claim 1 wherein the metal hydroxide is incorporated in a PE-EVA copolymer as a base material of the outer cladding.

7. An optical aerial cable system according to claim 6 wherein the metal hydroxide is incorporated in EPR as said base material of the outer cladding.

8. An optical aerial cable system according to claim 6 wherein the metal hydroxide is incorporated in EPDM as a base material of the outer cladding.

9. An optical aerial cable system according to claim 1 wherein aluminum hydroxide is employed as the metal hydroxide.

10. An optical aerial cable system according to claim 1 wherein magnesium hydroxide is employed as the metal hydroxide.

11. An optical aerial cable system according to claim 1 wherein zinc hydroxide is employed as the metal hydroxide.

12. An optical aerial cable system according to claim 1 wherein the outer cladding comprises aluminum hydroxide, PE/EVA copolymer, ethylene/propylene rubber, a stabilizer, a lubricant, coloring pigments, and hydrosilicon.

13. An optical cable system, comprising:
    a conductive high tension power line;
    a non-conductive optical cable having no electrically conductive parts positioned substantially parallel to and spaced from the power line;
    the power line and optical cable being suspended from a common high tension tower; and
    the optical cable having
       at least one light waveguide,
       an outer cladding surrounding the light waveguide,
       means between the light waveguide and outer cladding for support and for positioning the light waveguide within the outer cladding; and
       said outer cladding comprising a self-protecting material means which remains highly insulating when affected by electrical discharge resulting from the high tension line and which includes a metal hydroxide between 30 and 60 weight percent.

14. An optical cable system according to claim 13 wherein the metal hydroxide is mixed in with a PE-EVA copolymer as a base material of the outer cladding.

* * * * *